United States Patent [19]
Rickenbacher et al.

[11] 3,792,968
[45] Feb. 19, 1974

[54] HALOGENATED DIAMINO DIHYDROXY ANTHRAQUINONES ON A SUBLIMATION TRANSFER MEMBER

[75] Inventors: Hans Rudolf Rickenbacher, Basel; Guenther Zwahlen, Dornach; Juergen Markert, Basel, all of Switzerland

[73] Assignee: Ciba-Geigy AG, Basel, Switzerland

[22] Filed: Mar. 26, 1971

[21] Appl. No.: 128,513

[30] Foreign Application Priority Data
Apr. 1, 1970 Switzerland.......................... 4788/70

[52] U.S. Cl............................................. 8/2.5, 8/39
[51] Int. Cl............................................... D06p 1/20
[58] Field of Search........................ 8/2.5; 101/470

[56] References Cited
UNITED STATES PATENTS
2,990,413   6/1961   Gehrke................................. 8/39 C
3,636,008   1/1972   Yemada................................ 8/34 C FOREIGN PATENTS OR APPLICATIONS
1,169,957   11/1969   Great Britain........................ 8/2.5

OTHER PUBLICATIONS
American Dyestuff Reporter, Jan. 4, 1965 pages 26–38 TP 890 A512.
Datye, Textilveredlung 4, 1969 No. 7, pages 562–572.

Primary Examiner—Donald Levy
Attorney, Agent, or Firm—Joseph G. Kolodny; Edward McC. Roberts

[57] ABSTRACT

Process for the printing textile materials of hydrophobic, synthetic polymers, wherein the textile material is printed to the transfer printing process with chlorinated 1,5-dihydroxy-4,8-diaminoanthraquinone or a mixture of chlorinated and brominated 1,5-dihydroxy-4,8-diaminoanthraquinone and optionally with other dyestuffs and/or fluorescent whitening agents.

4 Claims, No Drawings

HALOGENATED DIAMINO DIHYDROXY ANTHRAQUINONES ON A SUBLIMATION TRANSFER MEMBER

It is known to print continuous webs of textile materials with textile printing machines having engraved printing rollers. Fairly recently, also the so-called transfer printing process became known; in it, the dyestuffs are transferred from printed intermediate or auxiliary substrata, primarily strips of paper, to the textile substrate by diffusion or sublimation. To obtain blue shades by the transfer printing process, the Swiss patent application Ser. No. 10437/67 describes the use of brominated 1,5-dihydroxy-4,8-diaminoanthraquinones. However, these dyes involve a number of disadvantages. They give blue shades with a reddish hue which latter makes them less suitable for tri-chromatic printing. In addition, their bromine content makes them relatively expensive. Moreover, their manufacture depends on the availability of bromine. Apart from all that, the fastness properties of brominated 1,5-dihydroxy-4,8-diaminoanthraquinones are not fully satisfactory.

It has now been found that these difficulties can be avoided if the brominated 1,5-dihydroxy-4,8-diaminoanthraquinones are replaced by the chlorinated analogues.

Accordingly, this invention relates to a process for printing textile materials of hydrophobic, synthetic polymers in which the textile material is printed by the transfer printing process with chlorinated 1,5-dihydroxy-4,8-diaminoanthraquinone or a mixed chlorinated and brominated 1,5-dihydroxy-4,8-diaminoanthraquinone, optionally in conjunction with other dyestuffs and/or fluoroscent whitening agents.

Suitable dyestuffs are, for example the products of the formulae

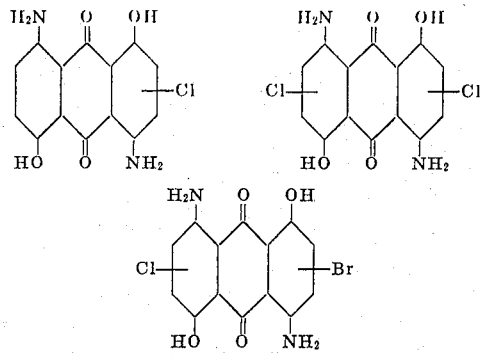

or mixtures thereof.

4,8-Diamino-1,5-dihydroxyanthraquinones that are both brominated and chlorinated are new compounds. They can be prepared by reacting a chlorinated anthraquinone with bromine in the presence of iodine and boric acid in solution in sulfuric acid monohydrate.

The dyestuffs that may be used concomitantly may be any desired dyestuffs or fluoroscent whitening agents that are suitable for transfer printing by virtue of their sublimation and diffusion properties, for example disperse dyestuffs of the following categories: Anthraquinoid dyestuffs such as hydroxy- and/or aminoanthraquinones, azo dyestuffs, quinophthalone dyestuffs, styryl dyestuffs or nitrodiarylamines.

Especially suitable are the monoazo, styryl, anthraquinone and quinophthalone dyestuffs, as for example those of the formulae

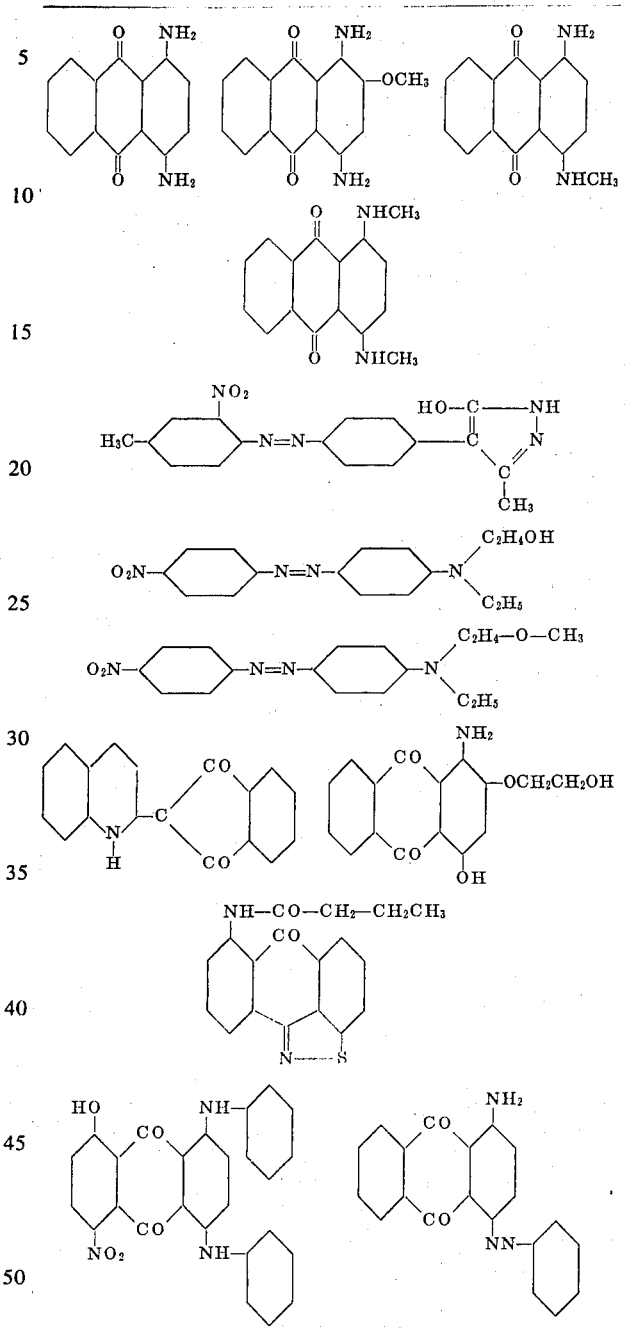

As anthraquinone dyestuffs suitable for concomitant use there may be mentioned especially derivatives of 1,8-dihydroxy-4,5-diaminoanthraquinone. Also the unsubstituted hydroxyaminoanthraquinones are suitable as dyestuffs, for example, 1,8-dihydroxy-4,5-diaminoanthraquinone and/or 1,5-dihydroxy-4,8-diaminoanthraquinone.

Of the fluorescent whitening agents there are suitable above all mono- and bisazole derivatives as well as benzoxazole derivatives, as for example the fluorescent whitening agents of the formula

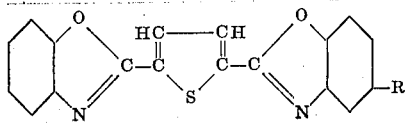

R = H, isopropyl, methyl, tertriary butyl.

It is of advantage to make concomitant use of those dystuffs and/or fluorescent whitening agents which on heating show a behaviour analogous to that of the chlorinated dihydroxydiaminoanthraquinones of this invention, especially those having similar sublimation properties.

Suitable textile substrates are above all tissues, knitted fabrics or non-wovens made from fibers which may be in the form of continuous webs or cut or sewn textiles or foils based on synthetic materials as for example acrylonitrile, for example polyacrylonitrile and copolymers of acrylonitrile and other vinyl compounds, such as acrylic esters, acrylamides, vinyl pyridine, vinyl chloride or vinylidene chloride, copolymers of dicyanethylene and vinyl acetate, as well as of acrylonitrile-block-copolymer, materials of polyvinyl chloride, of cellulose tri- and 2½ acetate and especially, materials of polyamides, such as polyamide-6, polyamide-6,6 or polyamide-12, and materials from aromatic polyesters, such as those of therephthalic acid and ethylene glycol or 1,4-dimethylcyclohexane, and copolymers of terephtalic or isophthalic acid and ethylene gylcol. A special use is the printing of anodized aluminium.

It is also possible to print union fabrics and union knitted fabrics of such materials and in fact both unions of fully synthetic, hydrophobic fibers, and unions comprising material and synthetic fibers.

It is likewise possible to print by the transfer printing process any material, for example wool or cotton that is impregnated, finished or coated with a synthetic polymer that is printable by the transfer printing process.

In multicolor printing by the transfer process it is appropriate to use the suitable chlorinated diaminodihydroxyanthraquinones together with other dyestuffs that sublime or diffuse within the same temperature range.

The intermediate or auxiliary substrates required for the transfer printing process may be of any desired structure, preferably they are non-textile structures, primarily flat structures based on cellulose, above all paper, also sheets of regenerated cellulose, and are given the desired pattern by printing with aqueous or preferably at least partially organic, especially practically anhydrous, organic printing inks. Metal foils can also be used as substrates, but use is made primarily of paper.

The dyestuffs are applied by printing and dried or they are applied by impregnation or dyeing of the intermediate carrier in the dyestuffs solution or dispersion (for example the dyebath) and then dried.

The intermediate substrates may be printed on both sides, and the colors and/or patterns need not be the same for both sides. To avoid the use of printing machines, the printing inks may be sprayed on to the intermediate substrate for example by means of a spraying gun. Especially pleasing effects are obtained when the intermediate substrate is sprayed or printed with more than one shade. In such operation, the desired pattern may be obtained with the use of a stencil, or artistic patterns by means of a paint brush. In printing the intermediate substrate, a wide variety of printing techniques can be employed, for example emulsion printing processes, flat printing processes (for example offset), letter press printing processes (for example book printing, flexographic printing), intaglio printing processes (for example roller printing, rotogravure), screen printing or electrostatic printing processes.

In a special embodiment of the transfer printing process, only chips, instead of a continuous strip, of the intermediate substrate are placed on the material to be printed.

To obtain these chips, the aforementioned intermediate carriers are given the desired shape, for example flowers, rings, triangles, discs, stars, strips, etc. by punching or cutting. Alternatively, chips of undyed intermediate substrates may be dyed or impregnated with dyestuff or dyestuffs, for example by immersion in a suitable dyestuff solution or dispersion.

These paper chips are then strewed on to the textile material to be printed, either by hand or with a suitable mechanical device, and then heated to the sublimation temperature in a suitable apparatus, for example on an ironing machine.

The two sides of a tissue, knitted material or fleece may thus be printed with identical or different patterns, either simultaneously or one after the other. It is also possible to place on the tissue to be printed, on top of the paper chips, a continuous strip of paper that has been impregnated with dyestuff; a reserve printing effect is then achieved in which the reserved areas are also printed.

A special reserve effect is obtained when, together with, or instead of, the colored chips uncolored chips, for example paper chips are used. There is also the possible of placing the chips of the intermediate carrier between two webs of tissue and thus to print both in one operation.

When dispersions are used, the dyestuffs dispersed in the printing ink must have a particle size mainly of $\geq 10\mu$ preferably $\geq 2\mu$. Apart from water, any organic solvent can be used that boils below 220°C, preferably below 150°C under atmospheric pressures, and have sufficient dissolving or emulsifying (dispersing) power, for the dyestuffs and binding agents used. Examples of suitable organic solvents are the following: aliphatic and aromatic hydrocarbons, for example n-heptane or benzene, xylene or toluene, halogenated hydrocarbons, such as methylene chloride, trichloroethylene or chlorobenzene, nitrated aliphatic hydrocarbons, such as nitropropane, aliphatic amides, such as dimethylformamide or mixtures thereof, also glycols, such as ethylene glycol or polyethyleneglycol-monoethyl ether or diethyl ether, diethylcarbonate, dimethylcarbonate or esters, such as ethyl acetate, propyl acetate, butyl acetate, $\beta$-ethoxyethyl acetate, aliphatic or cycloaliphatic ketones, for example methylethylketone, methylisobutylketone, cyclohexanone, isophorone, mesityl oxide or diacetone alcohol, mixtures of aliphatic ketone, for example methylethylketone, with an aromatic hydrocarbon, especially toluene, and alcohols, such as methanol, ethanol and preferably n-propanol, iso-propanol, n-butanol, tertiary butanol, secondary butanol or benzyl alcohol; there may further be used mixtures of several solvents containing at least one solvent of one of the classes mentioned. It is of advantage to use practically anhydrous printing inks.

Especially preferred solvents are esters, ketones or alcohols, such as butyl acetate, acetone, methylethylketone, ethanol, iso-propanol or butanol.

Apart from the dyestuff or fluorescent whitening agent and solvent (diluent) the printing inks of the invention contain preferably also at least one binding agent which acts as a thickener for the printing paste and as an at least temporary binder for the dyestuff on the material to be printed. As such binding agents there are suitable synthetic, semi-synthetic and natural resins, both polymers and polycondensation and polyaddition products. All resins and binding agents usually employed in the lacquer and printing ink industries can be used, such as are described for instance in Karsten's Table of lacquer raw materials (Lackrohstofftabellen) (4th edition, Hannover 1967) or in the work by Wagner and Sarx (4th edition Munich 1959) on artificial resins for lacquers. Preferably, physically drying resins are used, i.e. resins which do not react (or cross-link) in the air or with themselves, but which leave a dry film when the solvents is removed. It is of advantage to use resins which are soluble in the solvents used.

Examples of suitable resins are: Colophony and its derivatives, hydrogenated colophony, di- or polymerized colophony, in the form of the calcium or zinc salt, colophony esterified with monovalent or polyvalent alcohols; colophony resin modified with resin formers, such as acrylic acid and butanediol, or maleic acid and pentaerythritol; the soluble, colophonymodified phenol resins and resins based on acrylic compounds, maleinate resins, oil-free alkyd resins, styrolyzed alkyd resins, vinyltoluene modified alkyd resins, alkyd resins with synthetic fatty acids, linseed oil alkyd resins, ricinenic acid alkyd resins, castor oil alkyd resins, soja bean oil alkyd resins, coconut oil alkyd resins, tall oil and fish oil alkyd resins, acrylated alkyd resin, as well as oil and oil varnishes. Furthermore terpene resins, polyvinyl resins, such as polyvinyl acetate, polyvinyl chloride, polyvinylidene chloride, polyvinyl acetals, polyvinyl cohol, polyvinyl ether, mixed and grafted polymers with various vinyl monomers, polyacrylic acid resins, acrylate resins, polystyrols, polyisobutylene, polyesters based on phthalic acid, maleic acid, adipic acid, sebacic acid, etc. naphthalene formaldehyde resins, furan resins, ketone resins, aldehyde resins, polyurethanes (especially primary urethane products hardening at elevated temperature only), epoxide resins (especially resin/hardener mixture hardening at elevated temperature only), and their precondensates. Primary products of unsaturated polyester resins, diallylphthalate pre-polymers, polyolefins, such as polyethylene wax or polypropylene wax, indene and coumerone indene resins, carbamide and sulfonamide resins, polyamide and polyester resins, silicone resins, rubber and its derivatives such as cyclized or chlorinated rubber, above all cellulose derivatives, such as cellulose esters (nitrocellulose, cellulose acetate and the like) and especially cellulose ethers, such as methyl cellulose, hydroxyethyl cellulose, hydroxypropyl cellulose, cyanethyl cellulose, ethyl cellulose, and benzyl cellulose, Use may also be made of the corresponding derivatives of other polysaccharides.

The printing inks (solutions, dispersions, emulsions) prepared in the usual manner with the aforementioned resins, dyestuffs and solvents are applied in the manner described above directly to the auxiliary carrier material to be printed.

To improve the operating performance of the printing inks, optional components may be added, such as softeners, swelling agents, high-boiling solvents, such as, for example tetraline or decaline, inorganic or non-ionic surfactants, such as for example the condensation product of β-napthalene sulfonic acid with formaldehyde, partically desulfonated lignine sulfonate, or the condensation product of 1 mol of octylphenol with 8–10 mols of ethylene oxide.

The composition of the printing inks as regards the relative quantities of resin mixture and solvent mixture is determined by two requirements.

If solvents are used, they must be present in such quantity that the resin remains dissolved and/or dispersed and, on the other hand, the quantity of solvent must be within a range that well guarantee a degree of viscosity of the printing ink at which the printing process can be carried out. In intaglio printing for example a quantitative ratio of resin; solvent between 1:0.5 and 1:50, preferably between 1:1 and 1:20 gives good results.

For aqueous inks, water-soluble thickeners are used, as for example polyvinyl alcohol, carob meal, methyl cellulose or water-soluble polyacrylates.

In the preparation of printing inks, dyestuff preparations may be used which contain the aforementioned anthraquinone dyes and a resin which may be identical with, or different from, the thickeners mentioned above. If the resin is different from the thickeners, it may be one of low molecular weight that has no thickening action and merely serves to prevent agglomeration of the finely ground dyestuff. Advantageously, there are used as resins the above-mentioned cellulose derivatives.

The transfer printing operation is performed in the usual manner. To this end, the supports of the printing patterns are contected with the textile material and maintained at the sulbimation, or diffusion, temperature, respectively, until the dyes have gone over from the auxiliary support to the textile material. Heating to 150°–220°C for a short while (10 to 60 seconds) suffices at a rule. However, transfer printing is possible also at lower temperatures, for example on polyvinyl chloride at 110°C. The transfer printing operation can be carried out continuously on a heated roller or with a heating plate (iron or heated press) or with the use of steam of of dry, warm air under atmospheric pressure or in vacuo.

When the transfer printing is carried out with steam, the steam may be passed through the device which presses the auxiliary support against the substrate to be printed, or through the substrate to be printed using, for example perforated drums.

The following examples illustrate the invention. Unless otherwise stated, the parts and percentages are by weight. The relationship between parts by weight and parts by volume is the same as that between grams and milliliter.

EXAMPLE 1

Five Parts of the blue dyestuff of the formula

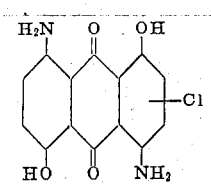

Ten parts of ethyl cellulose (Ethocel E 7, Dow Chem.) and 85 parts of ethanol are triturated in a ball mill for 24 hours; with the resulting printing ink, paper serving as auxiliary carrier can be printed. A blue pattern is obtained.

EXAMPLE 2

5 Parts of the dyestuff used in Example 1,
15 parts of nitrocellulose A 250 (containing 18 percent of dibutylphthalate),
10 parts of glycol monoethyl ether,
30 parts of methyl ethyl ketone, and
40 parts of ethanol are stirred for 15 minutes using a toothed disk mill having a circumferential speed of about 12 m/sec. The resulting printing ink is used for printing a blue pattern on paper.

EXAMPLE 3 a. A printing ink consisting of 5 parts of the dyestuff mentioned in Example 1 is dissolved in 5 parts of ethyl cellulose (Ethocel E 7, Dow Chem.) and 90 parts of methyl-ethyl-ketone and used for printing paper. A blue pattern is obtained.

b. Glued paper is dipped into the dyestuff solution for a short while (for example 10 seconds), and the solvent allowed to evaporate in the air. The paper is suitable as intermediate carrier or for the punching of chips of intermediate carrier.

EXAMPLE 4

One Part of the blue dyestuff of the formula

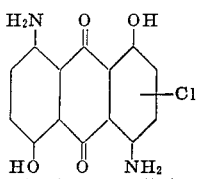

is dissolved in 9 parts of dimethylformamide. A strip of unglued paper is dipped briefly into the dyestuff solution and the solvent then removed in a vacuum cabinet. The resulting blue paper is suitable as intermediate carrier or for the manufacture of chips of intermediate carrier.

EXAMPLE 5

In a sand mill, 20 parts of the blue dyestuff of the formula

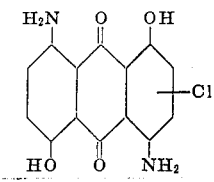

are ground for 24 hours while cooling, with 20 parts of hydroxypropyl cellulose (Trade Mark Klucel J; Hercules) and 360 parts of water. The ground material is then freed from water by spray-drying. A loose, blue powder is obtained which can be redispersed simply by stirring into water and/or certain organic solvents, optionally with the addition of further binding agents, to obtain a ready-to-use printing or dyeing ink.

EXAMPLE 6

In a kneader:

1 part of the blue dyestuff mentioned in example 5,
1 part of ethyl cellulose (Ethocel E 7, Dow Chem.),
4 parts of ground sodium chloride, and
1 part of diacetone alcohol are kneaded at 40°–45°C for 4 hours. The kneaded mass is granulated by the addition of 1 part of water, and then subjected in wet grinding with the use of about 50–100 parts of water. The resulting suspension is filtered, freed from solvent and salt by washing with water, and the filter cake obtained is dried in a vacuum cabinet at about 80°C. A blue preparation is obtained which is excellently suitable for coloring printing inks for the graphic industry.

EXAMPLE 7

In an attritor or sand mill:
1 part of the blue dyestuff mentioned in Example 5,
1 part of Ethocel E 7, and
8 parts of water and ground for 8 hours.

The ground material is separated from the grinding auxiliaries, filtered, and the filter cake is dried in a vacuum cabinet. A blue preparation corresponding to that of Example 6 is obtained.

EXAMPLE 8

Five Parts of the dyestuff preparation obtained according to Example 6, consisting of equal parts of the blue dyestuff and ethyl cellulose (Dow Chem. Ethocel E 7), are stirred in the course of 30 minutes into a solution of 6.5 parts of ethyl cellulose in 88.5 parts of isopropyl alcohol, using an ordinary two-blade stirrer. The printing ink so obtained, in which the dyestuff is finely and homogeneously distributed, is suitable for the manufacture of intermediate carrier paper by dyeing, printing on one or both sides, or spraying.

When the procedure is as above, except that 5 parts of the preparation obtained according to Example 5 or of the preparation obtained according to Example 7, are used, a valuable printing ink is obtained too.

EXAMPLE 9

Circular cuttings having a diameter of 1–2 cm are punched out of intermediate carrier papers according to Examples 1–4 and 8, which are printed or dyed on one or both sides and are obtained by dyeing, or printing with a single color or multicolor pattern or spraying with colored inks. The punched discs are strewed on to a polyester fabric and then heated at 220°C for 30 seconds in contact with a heating plate (ironing press). A fabric with a blue dot pattern is obtained.

Under the same conditions, blue patterns having good fastness properties are obtained when uncut paper is placed on a polyester fabric or a polyamide fabric.

EXAMPLE 10

In a kneader, 1 part of the blue dyestuff of the formula

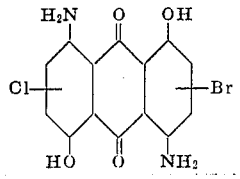

1 part of ethyl cellulose (Ethocel E 7, Dow Chem.), 4 parts of ground sodium chloride and 1 part of diacetone alcohol are kneaded at 40°-45°C for 4 hours. The mixture is granulated by the addition of 1 part of water, and then wet-ground with about 50-100 parts of water. The resulting suspension is filtered, washed with water to free it from solvent and salt, a and the resulting filter cake is dried in a vacuum cabinet at about 80°C. A blue preparation is obtained which is excellently suitable for coloring printing inks for the graphic trade.

Five parts of the resulting dyestuff preparation consisting of equal parts of the blue dyestuff and ethyl cellulose (Dow Chem.), Ethocel E 7) are stirred into a solution of 6.5 parts of ethyl cellulose in 88.5 parts of isopropyl alcohol, using an ordinary two-blade stirrer. The printing ink so obtained in which the dyestuff is homogenesouly and finely distributed serves for the manufacture of intermdiate carrier papers by dyeing, printing or one or both sides, or spraying.

Preparation of a mixed-halogenated dihydroxy-diaminoanthraquinone

A suspension of 34 parts of 1,5-dihydroxy-4,8-diaminoanthraquinone in 300 parts of chlorobenzene and 44 parts of dimethylformamide is heated to 50°-55°C in the course of 30 minutes. Chlorine is then introduced until a test portion, after working up, has a chlorine content of 12 percent. The precipitate is filtered off with suction and washed with 120 parts of chlorobenzene, then distilled with steam. This operation is followed by filtering with suction, washing with water, after which the filter cake is dissolved in 300 parts of sulfuric acid monohydrate while cooling. After the addition of 1.2 parts of iodine, 12 parts of boric acid, and 12.5 parts of bromine, the solution is heated at 80°C and brominated at this temperature until a worked-up test portion contains 12 percent of bromine. The batch is stirred into 300 parts of ice, and the resulting precipitate is washed neutral with water.

After drying, 43 parts of a blue-violet dyestuff powder of the formula

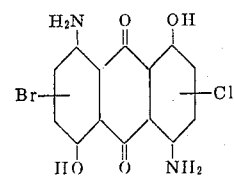

are obtained.

What we claim is:

1. Non-textile flat structures of cellulose of metal foil for use in the sublimation transfer printing of textile materials, which structures are printed with a dyestuff selected from the group consisting of those of the formulae

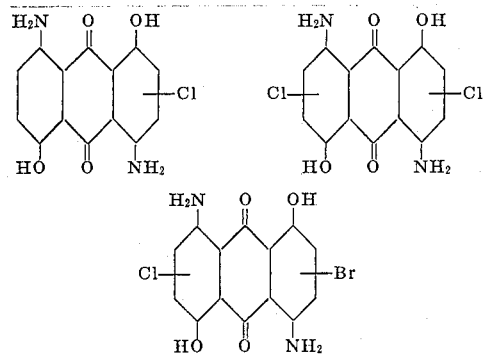

2. Flat structures according to claim 1 consisting of paper.

3. Flat structures according to claim 1, which contain the dyestuff together with a cellulose ether or ester.

4. Flat structures according to claim 1, which contain the dyestuff at least partially in a phase that is soluble in an organic solvent.

* * * * *

UNITED STATES PATENT OFFICE
CERTIFICATE OF CORRECTION

Patent No. 3,792,968            Dated February 19, 1974

Inventor(s) HANS RUDOLF RICKENBACHER ET AL

It is certified that error appears in the above-identified patent and that said Letters Patent are hereby corrected as shown below:

In column 10, line 13, claim 1, change "of" in its second occurrence to -- or --.

Signed and sealed this 10th day of September 1974.

(SEAL)
Attest:

McCOY M. GIBSON, JR.
Attesting Officer

C. MARSHALL DANN
Commissioner of Patents